United States Patent [19]

Schwarz

[11] Patent Number: 4,484,880
[45] Date of Patent: Nov. 27, 1984

[54] CLAMPING DEVICE FOR CLAMPING THE FORM TOOLS OF AN INJECTION MOLDING MACHINE TO FORM SUPPORTS

[75] Inventor: Georg Schwarz, Schwertberg, Austria

[73] Assignee: Ludwig Engel KG, Austria

[21] Appl. No.: 495,353

[22] PCT Filed: Sep. 9, 1982

[86] PCT No.: PCT/AT82/00026
§ 371 Date: May 9, 1983
§ 102(e) Date: May 9, 1983

[87] PCT Pub. No.: WO83/01038
PCT Pub. Date: Mar. 31, 1983

[30] Foreign Application Priority Data

Sep. 14, 1981 [AT] Austria .................................. 3955/81
Sep. 14, 1981 [AT] Austria .................................. 3956/81

[51] Int. Cl.³ ............................................... B28B 7/00
[52] U.S. Cl. ............................. 425/192 R; 425/451.9
[58] Field of Search ............... 425/192 R, 451.9, 190, 425/182, 595

[56] References Cited

U.S. PATENT DOCUMENTS

| | | | |
|---|---|---|---|
| 2,649,621 | 8/1953 | Moslo | 425/192 |
| 3,456,297 | 7/1969 | Andreasson | 425/192 |
| 3,818,801 | 6/1974 | Kime | 60/488 |
| 4,116,599 | 9/1978 | Ruegg | 425/192 R |
| 4,348,165 | 9/1982 | Vostrovsky | 425/190 |

Primary Examiner—Donald Czaja
Assistant Examiner—V. Fischbach
Attorney, Agent, or Firm—McGlew and Tuttle

[57] ABSTRACT

A clamping device for clamping the form tools (3) to the form supports (1) of an injection molding machine. The form tools (3) are provided with clamping bolts (6). At the form supports (1) there are lateral recesses (17) in which locking means (9) are arranged which fix the clamping bolts (6) within the form supports (1). Furthermore, positioning means for positioning the form tools (3) in the closing plane are provided.

7 Claims, 4 Drawing Figures

CLAMPING DEVICE FOR CLAMPING THE FORM TOOLS OF AN INJECTION MOLDING MACHINE TO FORM SUPPORTS

FIELD AND BACKGROUND OF THE INVENTION

The invention relates to a clamping device for clamping the form tools of an injection molding machine to form supports, comprising at least two and preferably four clamping bolts on the rear side of each form tool, which are perpendicular to the form parting plane and protrude into holes in the form support, and locking means for the form tools.

In general, when fastening form tools to form supports, the holding means for the respective tool part are arranged in the form space between the supports. As a result damage caused by the form easily occured and, further, access to the form parts between the tension rods was difficult. Another problem was caused by the fact that without excessive expenses they could hardly be made sufficiently stable to absorb high tool opening forces.

The DE-OS No. 27 24 020 suggests to provide a clamping device for clamping the form parts of an injection molding machine to the form supports in which each form part has guide bolts at its rear side which are perpendicularly aligned to the form parting plane, protrude through bores in the form support and project beyond the rear side of the form support. On the rear side of the tool support transverse slide means are arranged which engage in lateral openings in the guide bolts and press the form part against the form support by means of a wedge surface.

It was the object of this document to arrange the clamping means, i.e. the transverse slide means, no longer in the form space between the supports and to protect them, thus, from being damaged. This construction has proved unsuitable for use in practice because the length of the guide bolts, which must be longer than the width of the form supports, would require excessive opening distances in order to be able at all to exchange the form tools. Another disadvantage would result from the use of the guide bolts as fastening means. This would require that the guide bolts and the corresponding bores in the tool supports be extremely precise, so that the form tools are properly centered—a problem which grows naturally the harder the more guide bolts are necessary for fastening a form tool to the form support.

SUMMARY OF THE INVENTION

It is the object of the invention to provide a clamping device of the above-mentioned kind which has, on the one side, the advantage that the form space between the form supports is free from the clamping means for the form tools and that, on the other side, the form opening distances can be small, i.e. like fastening by means of fastening members at the front of the form supports, and in which the centering of the tools is effected independently from the clamping elements.

This is achieved according to the invention by openings extending at the sides of the form support which run into the holes for the clamping bolts and in which the locking means engaging at the clamping bolts within the form support are arranged, a guide bolt known per se or the like for positioning the form tools in the closing plane being provided.

The extremely short clamping bolts do not interfere with the guiding and centering of the form tools. With the clamping device according to the invention the centering of the form tools can be effected from form tool to form tool as well as from form tool to form support.

When centering as first mentioned, one guide bolt of one form tool projects, for example, into a guide bore of the other form tool. This centering is constructionally simple and very precise as no indirect way, by using parts of the machine, is chosen. When centering form tool to form support, in the center of the rear side of the form tool a centering member having the shape of a truncated cone can, for example, be provided, which extends in the mounted position into a corresponding opening or recess in the form suppert.

In both cases the actual fastening of the form tools to the form supports is effected independently of the centering of the form tools.

An embodiment of the invention provides that the locking means have wedge-shaped slides, that the clamping bolts have holes with corresponding walls in which the slides engage and that the slides are acted upon by piston-cylinder units laterally arranged at the form supports and having a stronger releasing force than clamping force. Thereby impeccable releasing of the slides is ensured.

BRIEF DESCRIPTION OF THE DRAWINGS

In the following an embodiment of the invention is described by means of the figures of the drawing.

DESCRIPTION OF THE PREFERRED EMBODIMENTS

In the following only one clamping bolt 6 and the associated parts of a form tool 3 and of a form support 1 are described. The other clamping bolts 6 and the associated locking means at the same as well as at the opposite form tool 3 and form support 1 are naturally of analogous configuration.

The other components of the injection molding machine, such as the injection nozzles, means for feeding plastic material and the closing mechanism, will not be described within the scope of the following description as they are not subject of the invention and are constructed according to the known prior art.

Figure 1:
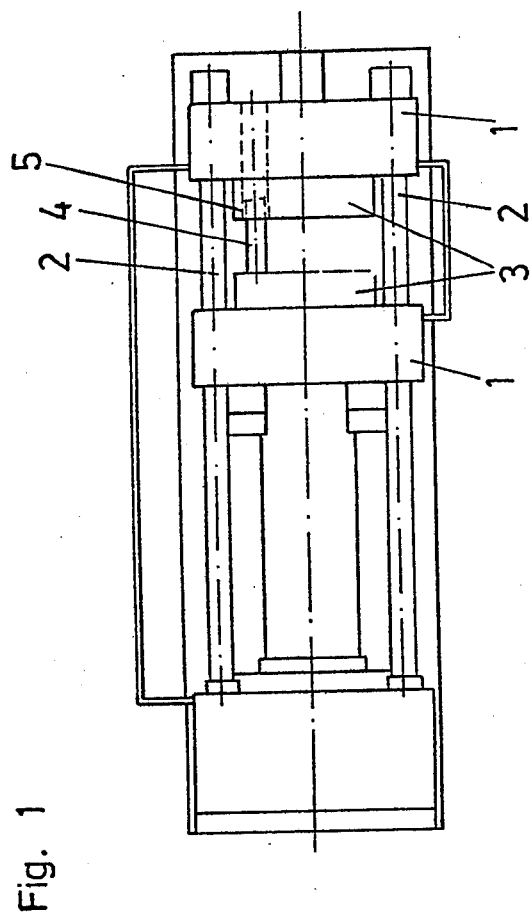
FIG. 1 shows a schematic top view of an injection molding machine with a clamping device in accordance with the invention.

On the injection molding machine shown in FIG. 1 the form supports 1 are positioned on tension rods 2 in a conventional manner.

Both form supports 1 carry form tools 3. One form tool 3 has a guide bolt 4 which projects into a guide bore 5 in the other form tool 3. The guide bolt 4 and the guide bore 5 center the form tools in the closing plane and must therefore be made with uttermost accuracy.

Each form tool 3 has four clamping bolts 6 on its rear side. The clamping bolts 6 project into corresponding holes 7, which are blind holes in the embodiment, in the form support 1.

The clamping bolts 6 have radial through holes 8 whose walls form, on the side directed away from the form tool 3, as inclined surface 8'.

In the form support 1, laterally in respect of the holes 7 and parallel to the form parting plane T wedge-shaped slides of the locking means 9 are mounted which are positioned in recesses 17 in the form supports 1. The recesses 17 are open at the sides of the form supports 1. These wedge-shaped slides 9 are acted upon by hydraulic piston-cylinder units 10 and, when the form tools 3 are mounted, they latch into the holes 8 of the clamping bolts 6.

Because of the wedge surface 11 on the slide and the corresponding wall 8' optimal clamping of the tools 3 to the form supports 1 is obtained. In the embodiment the angle of the inclined surface 8' as well as of the wedge surface 11 is 15°. It is therefore not a selflocking wedge surface.

As can readily be seen from the afore-mentioned, the form tools 3 are easily fastenable to the form supports 1 by means of the clamping device according to the invention. The parts serving as clamping device are outside the form space, the clamping bolts 6 can be very short and centering of the form tools 3 can be effected independently of the fastening means through conventional, constructionally simple means.

Care must be taken that during the whole operation of the injection molding machine the slides 9 are in the closed position, i.e. in the holes 8 of the clamping bolts 6 and are constantly under pressure form the hydraulic system, i.e. the piston 12 of the hydraulic piston-cylinder unit 10 is constantly under pressure and, hence, presses onto the associated slide of the locking means 9.

Figure 2:
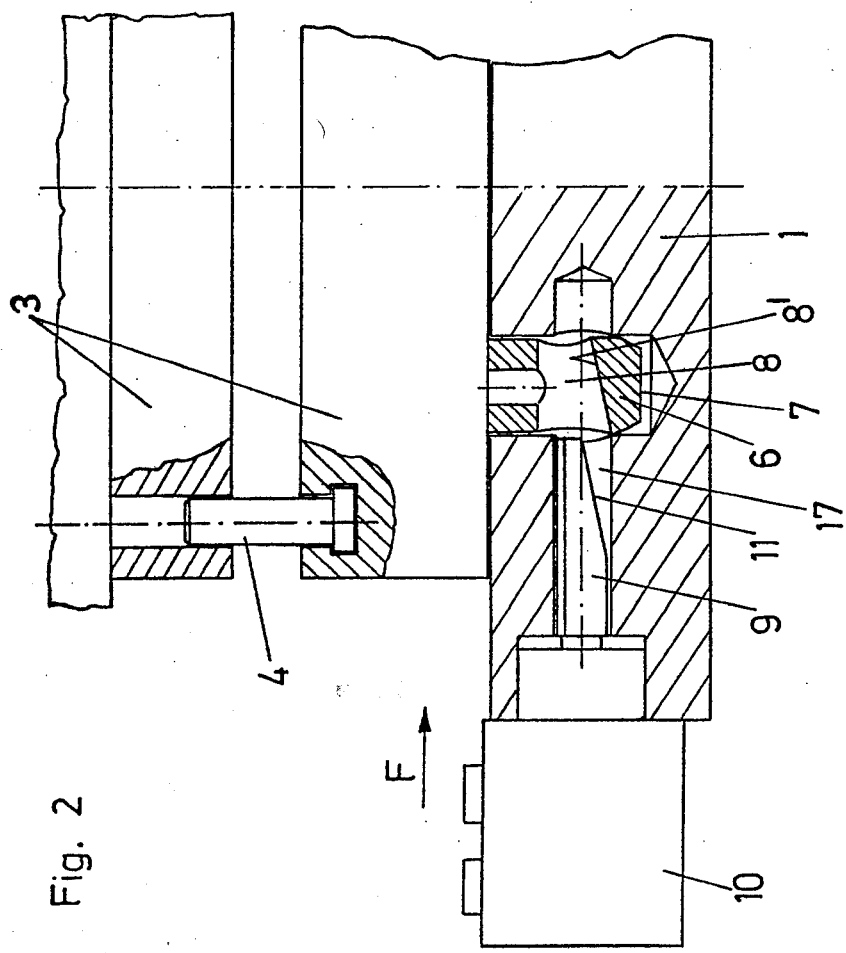
FIG. 2 shows a sectional view of a half of a form support and a form tool with the clamping device in accordance with the invention at one side of the injection molding machine, and FIGS. 3 and 4, each, show schematic views of two embodiments of the hydraulic piston-cylinder units acting upon the slides of the clamping device.

Because of the high forces which occur during the injection operation the form tools 3 are deformed and the clamping bolts 6 are pushed further into the form supports 1. As the slides 9 of the locking means 9 are acted upon by the piston 12 they are constantly further pushed in the closing direction, that is in the direction of arrow F of FIG. 2, into the holes 8.

As a consequence, when the form tools 3 have to be exchanged, much stronger forces are necessary to unlock the slides than are necessary for locking.

These requirements could not be fulfilled by conventional piston-cylinder units.

Figure 3:
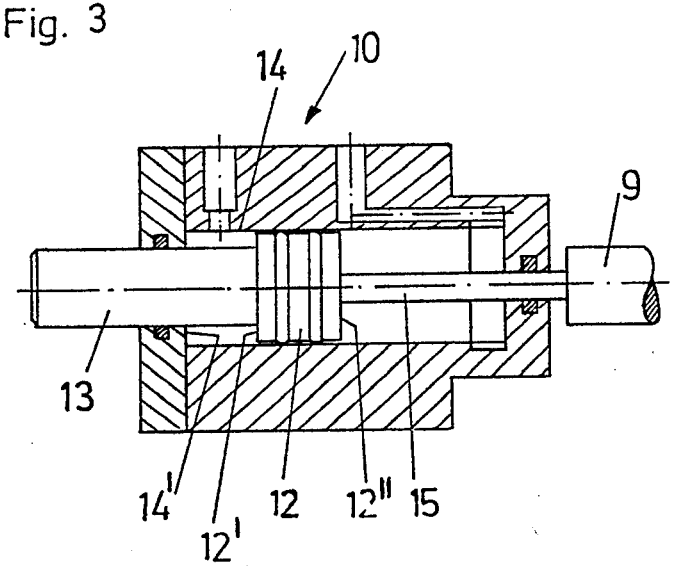
Figure 4:
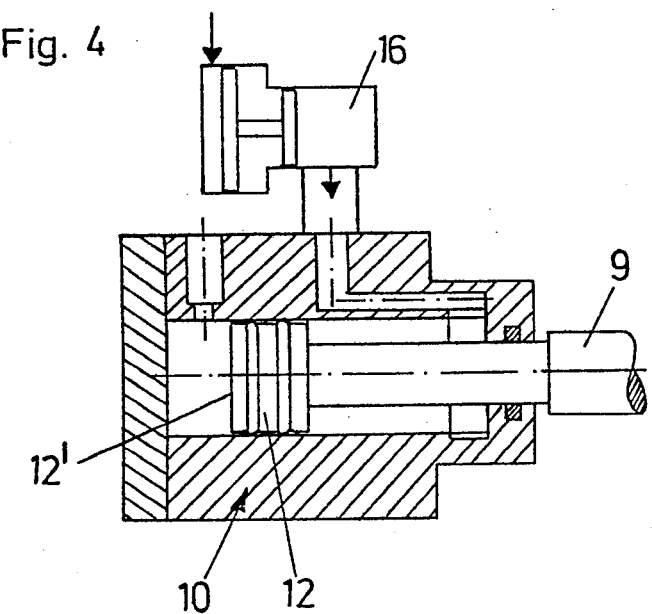

Therefore piston-cylinder units 10, as shown schematically in FIGS. 3 and 4, were used with and developed for the clamping device according to the invention.

FIG. 3 shows an embodiment in which the piston 12 has on its rear piston surface 12' a cylindrical displacement body 13 which extends sealingly through the rear wall 14' of the cylinder 14.

The diameter of this cylindrical displacement body 13 is larger than the diameter of the piston rod 15, which runs directly to the slide 9.

The whole piston-cylinder unit 10 is advantageously slightly bigger than a conventional piston-cylinder unit would normally be to produce the necessary clamping forces.

Due to the displacement body 13 the effective piston surface 12' for the clamping force is smaller than the opposite piston surface 12" for the releasing force. Therefore the piston-cylinder unit 10 according to FIG. 3 fulfils the requirement that the force for unlocking the slide of the locking means 9 must be bigger than the force for locking it.

Another solution was chosen by means of the piston-cylinder unit 10 unit according to FIG. 4 in which the piston 12 is made in a conventional manner.

Pressure increasing means 16 are connected to the releasing or opening side of the cylinder 14. By means of the pressure increasing means 16 higher pressure per cm$^2$ can be built up at the piston side 12" of the piston than at the piston side 12'. This piston-cylinder unit 10, too, hence corresponds to the requirement of the clamping device according to the invention.

I claim:

1. A clamping device for clamping at least one form tool in an injection molding machine having a pair of form tools with a parting plane therebetween, comprising:
    a form support (1) having a plurality of form support holes (7) therein extending perpendicular to the parting plane, and a form support opening (17) extending at a side of said form support into each form support hole (7);
    the one form tool having a plurality of clamping bolts (6) extending perpendicular to the parting plane and being received with clearance in each of said form support holes (7) of said form support holes (7), each bolt having a length which is less than a width of said form support and having a through opening (8);
    a slide (9) having a piston rod connected thereto for each form support opening, one slide movable in each form support opening (17), into and out of the through opening (8) of each bolt (6) in each form support hole (7) to retain the one form tool in said form support; and
    a separate guide bolt (4) connected to the one form tool for positioning the form tool (3) in a closing plane said guide bolt extending into a positioning hole in the other form tool.

2. Clamping device according to claim 1, characterized in that the slides (9) are wedge-shaped and are acted upon by piston-cylinder units (10) laterally arranged at the form supports (1) and having a stronger releasing force than clamping force.

3. Clamping device according to claim 1, characterized in that at the side opposite the piston rod (15) a displacement body (13) is provided at the piston (12) of the piston-cylinder unit (10).

4. Clamping device according to claim 1, characterized by pressure increasing means (16) at the unlocking side of the hydraulic piston-cylinder unit (10).

5. Clamping device according to claim 3, characterized in that the displacement body (13) is a cylinder sealingly arranged in the face (14) of the hydraulic cylinder (14).

6. A clamping device for clamping at least one form tool in an injection molding machine having a pair of form tools with a parting plane therebetween, comprising:
    a form support (1) having a plurality of form support holes (7) therein extending perpendicular to the parting plane, and a form support opening (17) extending at a side of said form support into each form support hole;
    the one form tool having a plurality of clamping bolts (6) extending perpendicular to the parting plane into each of said form support holes, each bolt having a length which is less than a width of said form support and a through opening (8);

a cylinder (10) connected to said form support adjacent each form support opening;

a piston (12) movably mounted in each cylinder and having a first piston surface facing said form support and an opposite piston surface;

a piston rod connected to and extending from said first piston surface through said cylinder;

a displacement body connected to and extending from said opposite piston surface and through said cylinder, a relative radius of said piston rod and said displacement body selected so that an effective remaining portion of said first piston surface in said cylinder is greater than an effective remaining portion of said opposite piston surface in said cylinder; and a slide (9) connected to each piston rod and movable in each form support opening, into and out of a through opening of a bolt in each form support hole.

7. A clamping device according to claim 6 wherein each clamping bolt is smaller than each respective form support hole (7), said through opening (8) of each bolt having an incline surface and each slide (9) having a wedge shape engagable with said inclined surface of a respective through opening.

* * * * *